Figure 1:
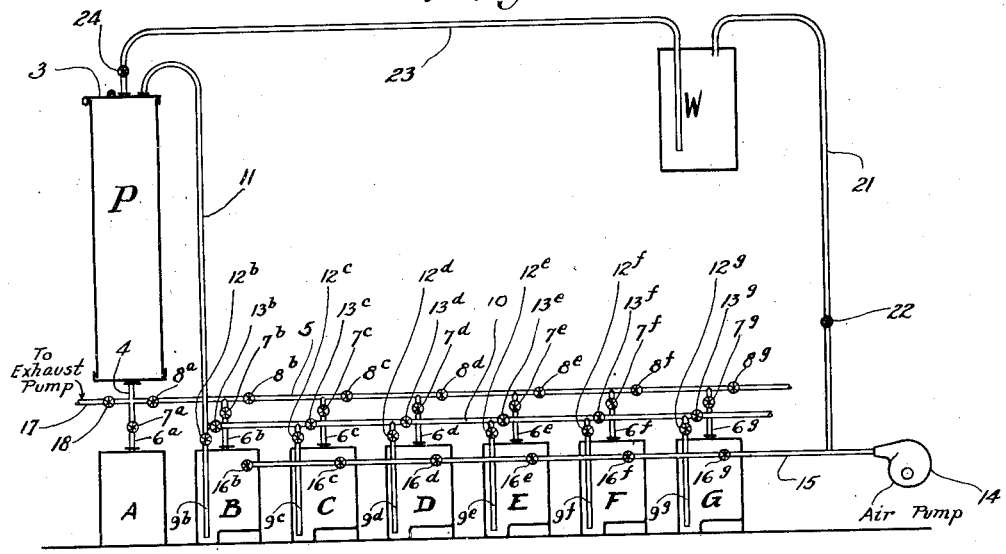

Oct. 9, 1928.

1,687,112

F. L. SLOCUM ET AL

PROCESS OF MAKING LIQUID COFFEE EXTRACT

Filed March 2, 1923

WITNESSES

INVENTORS

Patented Oct. 9, 1928.

1,687,112

UNITED STATES PATENT OFFICE.

FRANK L. SLOCUM AND WILLIAM E. TROUTMAN, OF PITTSBURGH, PENNSYLVANIA, ASSIGNORS TO MAGIC COFFEE COMPANY, OF PITTSBURGH, PENNSYLVANIA, A CORPORATION OF DELAWARE.

PROCESS OF MAKING LIQUID COFFEE EXTRACT.

Application filed March 2, 1923. Serial No 622,333.

This invention relates to a process for producing a liquid extract of coffee from which coffee can be instantaneously prepared by merely adding a predetermined small quantity, say a teaspoonful of the extract to a cup of water, and capable of use with either hot or cold water, as desired.

The object of the invention is to produce a highly concentrated coffee extract; to extract practically all of the requisite principles from roasted coffee, thereby to make an extract which will yield more cups of coffee per pound of roasted coffee treated than with methods heretofore in use; to avoid extracting from the roasted coffee undesirable substances having disagreeable tastes and odors, but extracting therefrom practically all of the caffeol, its accompanying agreeable aromas, along with those desirable active compounds contained in the original roasted coffee.

The essential steps of the invention consist in percolating water through properly roasted and ground coffee; separating the percolate into several successive measured fractions, and successively using all of these fractions except the first to percolate another fresh portion of ground coffee, likewise taking off the percolate from this portion in several successive fractions, the first of which will be the desired concentrated extract; then using all of the remaining fractions in succession for similarly treating still another fresh portion of coffee, and so on ad infinitum.

The process is carried on entirely without the application of heat and purposely at a temperature preferably below 15° C., the water added to replace that lost in the finished concentrate and in addition that remaining in the spent coffee grounds after percolation, as well as the partially-concentrated percolates employed being cold, and distilled water is preferably used. If roasted ground coffee is mixed with one-half to three-fourths of its weight of water, energetic chemical action occurs producing heat which is detrimental to the flavor and taste of the coffee. These undesirable results are practically prevented by the use of proper quantities of water and partially concentrated percolates in a cold state, and partially by the moistening and saturating of the fresh portions of ground coffee immediately after grinding together with the hastening of the process by the use of vacuum and pressures. Although caffeol and its accompanying aromas are exceedingly difficult to extract, it has been found that by preventing the deleterious chemical action above noted, by removing all of the air and occluded gases from the ground coffee sealed from the air so as to avoid the absorption of moisture and the presence of free oxygen, by quickly flooding the portions of ground coffee in vacuo with successive partial concentrated percolates beginning with the most concentrated partial percolate and finishing with the least concentrated, and by permitting the saturated coffee to stand until thoroughly macerated and osmotic action has equalized the solution surrounding and within the particles of coffee, these desirable compounds are eventually obtained in their proper proportions in the final concentrated extract. Furthermore, practically all of the caffeol and the desirable bitter principles are extracted, and the aroma-producing principles thus retained.

Figure 2:
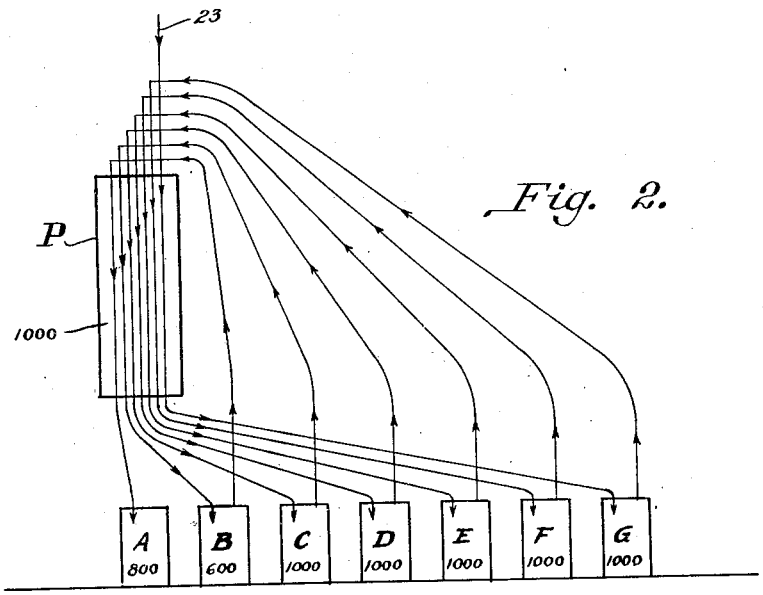

Obviously, the method can be carried out by various forms and arrangements of apparatus, either intermittently, or as a more or less continuous process. Fig. 1 of the accompanying drawings shows one arrangement of apparatus for carrying out the process in a more or less continuous way, and Fig. 2 is a diagrammatic view illustrating the course of the several fractions of percolates.

Referring to Fig. 1, P indicates the percolator, which is a vessel of suitable size to treat given quantities or portions of roasted ground coffee, so constructed that it can be sealed, being provided with a suitable opening and closure for introducing the roasted ground coffee and for discharging the spent grounds, for instance, the door 3. A, B, C, D, E, F and G represent containers to which the percolate is delivered in successive, separately measured volumes or fractions. Such containers may either be of glass with suitable graduations thereon, or of metal, in which case they will be provided with liquid gages, to indicate when the proper volume of percolate has flowed into the same. The lower end of the percolator P is provided with an outlet pipe 4 which connects with a manifold pipe 5, from which branches $6^a$, $6^b$, $6^c$, $6^d$, $6^e$, $6^f$, and $6^g$, extend to the vessels A, B, C, D, E, F and G respectively. Each of these branch pipes is provided with a cut-off valve, designated $7^a$, 7$^b$, 7$^c$, 7$^d$, 7$^e$, 7$^f$ and 7$^g$, respectively, and the manifold pipe also, adjacent to each of the branch pipes, is provided with cut-off valves 8$^a$, 8$^b$, 8$^c$, 8$^d$, 8$^e$, 8$^f$ and 8$^g$, respectively. By properly manipulating the several valves the first part of the extract coming from the percolator can be directed into vessel A and succeeding portions thereof, in succession, to the vessels, B, C, D, E, F and G, as is readily apparent.

To conduct the extracts from vessels B, C, D, E, F and G back into the percolator, each of said vessels is provided with an outlet pipe, indicated at 9$^b$, 9$^c$, 9$^d$, 9$^e$, 9$^f$ and 9$^g$, respectively, said pipes connecting with a manifold pipe 10 from which a pipe 11 leads to the top of the percolator. Located in each of the outlet pipes, in advance of its connection with the manifold 10, are the cut-off valves 12$^b$, 12$^c$, 12$^d$, 12$^e$, 12$^f$ and 12$^g$, respectively, and adjacent the point where each of the outlet pipes connects with the manifold 10 said manifold is provided with cut-off valves 13$^b$, 13$^c$, 13$^d$, 13$^e$, 13$^f$ and 13$^g$, respectively. By opening and closing the proper valves 12$^b$—12$^g$ and 13$^b$—13$^g$, the percolate contained in any of the vessels B, C, D, E, F and G, may be caused to flow through the pipes 10 and 11 to the top of the percolator P, in an obvious manner.

As a means for forcing the liquid from the vessels B, C, D, E, F and G into the percolator P, and also as a means for maintaining pressure above atmospheric pressure in the percolator, it is preferred to use air pressure, and for this purpose an air pump 14 of any suitable kind has its outlet connected to a pipe 15 from which branches extend to the upper portions of each of the vessels B, C, D, E, F and G, said branches being controlled by cut-off valves 16$^b$, 16$^c$, 16$^d$, 16$^e$, 16$^f$ and 16$^g$, respectively. It is noted that the outlet pipes 9$^b$, 9$^c$, 9$^d$, 9$^e$, 9$^f$ and 9$^g$, terminate close to the bottoms of their respective vessels, so that when air pressure is applied above the liquid in said vessels, said vessels will be substantially entirely emptied, that is to say, the entire contents of said vessels will be forced into the percolator. It is obvious that a liquid pump may be used for forcing the percolates back to the percolator, if desired, instead of air pressure as just described.

The manifold pipes 5 and 10 are shown as extending beyond the vessel G. This is intended to indicate that the number of vessels can be increased beyond the number illustrated, and in certain cases it may be found desirable to do so.

Either extending from the outlet pipe 4, from the percolator, or from a suitable point in the percolator, is a pipe 17 provided with a cut-off valve 18, which pipe is connected to any suitable exhaust apparatus, and serves the purpose of exhausting all of the air from the percolator P as well as all of the occluded gases from the ground coffee therein,—after introducing a fresh portion of coffee into the percolator.

Since the percolation of water through a single portion of coffee will not produce an extract of the desired concentration, it is necessary in starting the apparatus to conduct the percolate from the first portion of ground coffee to the vessels B, C, D, E, F and G, using none of said percolate as the finished extract, but having all of it available for treatment of the next fresh portion of ground coffee. Assuming that this has been done and that the vessels B, C, D, E, F and G each contains the desired volume of percolate, of successively decreased strength, the process is carried out as follows: The green coffee beans are roasted, immediately ground, and a given portion immediately placed in the percolator P. The percolator is then sealed, and the valve 18 in pipe 17 connected to the exhaust apparatus is manipulated to completely exhaust the air from the percolator and also to withdraw all occluded gases from the roasted ground coffee in the percolator. Satisfactory results are secured by exhausting to about one-tenth inch of mercury. Air pressure is then admitted to the vessel B, and valve 12$^b$ opened while valve 13$^b$ remains closed, thus forcing the contents of vessel B into the percolator. The fraction of percolate in vessel B serves to moisten the coffee in the percolator. Air pressure is then similarly admitted to vessel C, valve 12$^c$ being opened while valve 13$^c$ remains closed, thus forcing the percolate in vessel C into the percolator P. The additional percolate from vessel C will be sufficient to thoroughly saturate the coffee in the percolator. This stage will be indicated when the first drop of percolate passes out through the outlet pipe 4 in the bottom of the percolator, which outlet pipe is preferably provided with a glass section so as to render the passage of the percolate visible. The apparatus is then allowed to stand in this condition for such length of time as will allow the saturated coffee to macerate in the surrounding liquid until osmotic pressure is equalized between the solutions within and without the coffee particles, serving to dissolve most of the soluble principles of the coffee and to evenly distribute the soluble portion of the coffee in the liquid. The action is an osmotic action. The length of time this requires depends upon the fineness to which the roasted coffee is ground, and upon other conditions, it having been found that a period of 12 hours is ordinarily sufficient when the coffee is ground to a fineness of about twenty mesh. After the lapse of this period, the liquid is forced out of the percolator, preferably under pressure. The first fraction of this percolate is allowed to flow into the vessel A and constitutes the concentrated extract which is the complete product sought. The vessels C, D, E, F and G are in turn connected to the top of the percolator and the liquid contained therein is forced by air pressure through the percolator, and the percolate as it leaves the percolator is conducted in succession to the vessels B, C, D, E and F. The succeeding fractions of percolate which are allowed to flow to the vessels B and C will be used to moisten and saturate respectively, the next portion of ground coffee in the percolator P. After the vessel G has been emptied, additional water is forced through the percolator, such as from vessel W the top of which is connected to the outlet pipe 15 of the air pump by pipe 21, provided with cut-off valve 22. A pipe 23, depending within the vessel W and provided with cut-off valve 24, also leads to the top of the percolator. Enough water is added to replace and compensate for the volume of concentrated extract drawn off in the vessel A and the amount of moisture remaining in the portion of spent coffee grounds. The percolate produced from this additional water flows to the vessel G.

Fig. 2 diagrammatically illustrates the principal courses of circulation of the various fractions of percolate and fresh water. By following the arrows on the several lines in Fig. 2 the circulation will be clearly apparent. That is to say, the liquid from vessel B flows to the percolator and thence into the vessel A, while the liquid from vessel C primarily flows to the percolator and thence into vessel B, and so on throughout the series, the fresh water being introduced from pipe 23 flowing to vessel G. In practical operation in order to maintain the desired relative volumes, subsequently noted, in each of the several vessels, it is not always feasible to conduct the entire contents from one vessel to the one next preceding, in which event the said contents will be forced to the percolator and delivered to the preceding vessels in such quantities as to maintain the desired relative proportions therein.

It has been determined that a single pound of coffee will by this method produce enough concentrated extract to make sixty cups of coffee, that is to say, will produce about sixty teaspoonfuls of the concentrated extract. In a similar manner it has been determined that one thousand grams of ground roasted coffee will produce about eight hundred cubic centimeters of the concentrated extract, and that about six hundred cubic centimeters of percolate is sufficient to moisten one thousand grams of ground coffee. Consequently, with one thousand grams of coffee in the percolator, the percolate coming from said vessel will be directed as follows: Eight hundred c. c. to vessel A, six hundred c. c. to vessel B and one thousand c. c. to each of vessels C, D, E, F and G, etc., in case additional vessels are employed, the volume for the last vessel being obtained from fresh water which is added as above described.

The entire process is carried out without the application of heat, and preferably at a temperature at or below 15° C. This for the reason that it has been found that in order to positively preclude the deleterious chemical reactions noted, the temperature must not exceed this point. The water which is used and all of the fractions of percolate are constantly maintained at this low temperature. As a result the fats contained in the coffee, which in the raw bean is a vegetable lard, are not affected, and no disagreeable taste is produced such as occurs in processes involving the presence of heat.

Also, the operation is carried on by first removing the air and occluded gases from the dry coffee, flooding it as described above, then completing the operation under higher than atmospheric pressure. Consequently, all of the changes that take place are effected in the substantial absence of gases or air, and no deleterious effects due to chemical action or the presence of free oxygen are produced. As already stated, coffee absorbs moisture from the air very readily with rather a marked chemical reaction which generates considerable heat. In the process described the water and the fractions of percolate in the form of a partially-concentrated percolate are added in a cold state, and the volume used is so great that it floods the percolator, excluding all free oxygen during the time that any reactions would occur. That is to say, the contents of the vessels B and C which constitute a very considerable volume are in the percolator while the coffee is standing, and the specific heat and volume of water is too great to allow any noticeable change in temperature, preventing harmful effects which would otherwise occur from the heat developed and the presence of free oxygen. A further advantage derived from carrying on the process in a cold state and under pressure is that it avoids decomposition of caffeol. Caffeol decomposes quite rapidly under moderate heat in the presence of moisture, free air, and the accompanying compounds in roasted coffee, or in a partial vacuum when subjected to a quick change of pressure and temperature, producing disagreeable tastes and odors. This is entirely avoided in the process described.

The concentrated extract gathered in vessel A is drawn off and placed in a vessel which is hermetically sealed and then sterilized preferably at a temperature of about 105° C. for a suitable period of time, say about thirty minutes. However, sterilization can be effected within a wide range of temperature. The heating of the sealed vessel creates a pressure so that the sterilization occurs under pressure and prevents decompostion of the concentate. The sterilized extract is entirely stable and will keep for any desired length of time. Coffee can be prepared from it by merely adding the necessary quantity of the extract to water, and the coffee thus prepared is very agreeable in taste, in fact, is more agreeable than the best coffee prepared in the usual way from ground coffee or coffee extracts.

The spent grounds taken from the percolator P are used for the production of valuable by-products. The grease is first extracted by any of the well known commercial processes, such as the naphtha process, and is useful for soap, or can be further purified and used in food products. The remaining grounds contain about 2% of fixed nitrogen and constitute a valuable fertilizer.

With an apparatus such as shown in Fig. 1, the process is, of course, intermittent due to the fact that the saturated coffee grounds in the percolator P must be allowed to stand for a given time to bring about the necessary extracting conditions. However, by using a considerable number of such percolators, all of which can be connected to the same series of vessels A, B, C, D, E, F and G, and which can be successively charged and discharged, the process will approach a continuous one. The apparatus illustrated is not intended to show the best commercial layout, but merely one arrangement of apparatus suitable for carrying out the process. Indeed, the process may be carried out by nothing more than a percolator with a series of separately movable vessels to which the percolate can be conducted in succession through a rubber hose or the like, with an ordinary hand air pump for producing the necessary pressure to force the percolate out of the several vessels back into the percolator. No claim herein is made for the apparatus, but only for the process.

We claim:

1. The process of making coffee extract, consisting in thoroughly saturating roasted ground coffee with a liquid formed by previously percolating cold water through roasted ground coffee, allowing the saturated coffee to stand until thoroughly macerated and osmotic action has equalized the solution surrounding and within the particles of coffee, and then drawing off the percolate.

2. The process of making coffee extract, consisting in thoroughly saturating roasted ground coffee with a liquid formed by previously percolating cold water through roasted ground coffee, allowing the saturated coffee to stand until thoroughly macerated and osmotic action has equalized the solution surrounding and within the particles of coffee, separately drawing off the first of the percolate, drawing off the remainder of the percolate, and repercolating the latter through a fresh portion of coffee.

3. The process of making coffee extract, consisting in thoroughly saturating roasted ground coffee with a liquid formed by previously percolating cold water through roasted ground coffee, allowing the saturated coffee to macerate in the surrounding liquid, separately drawing off the first portion percolated, drawing off the remainder of the percolate and using it to saturate a second portion of coffee, said percolation and repercolation being effected under pressure above atmospheric pressure.

4. The process of making coffee extract, consisting in placing roasted ground coffee in a closed vessel, withdrawing the air and occluded gases, thoroughly saturating the roasted ground coffee with a liquid formed by previously percolating cold water through roasted ground coffee, allowing the saturated coffee to macerate in the surrounding liquid, separately drawing off a fraction of the percolate, drawing off the balance of the percolate and utilizing the latter to saturate a fresh portion of roasted ground coffee.

5. The process of making coffee extract, consisting in placing roasted ground coffee in a closed vessel, removing the air and occluded gases, thoroughly saturating the roasted ground coffee with a liquid formed by previously percolating cold water through roasted ground coffee, allowing the saturated coffee to macerate in the surrounding liquid, separately drawing off a fraction of the percolate, drawing off the balance of the percolate and utilizing the latter to saturate a fresh portion of roasted ground coffee, said percolation and repercolation being carried on under pressure in excess of atmospheric pressure.

6. The process of making coffee extract, consisting in percolating water through roasted ground coffee, taking off the percolate in separate successive fractions of measured volume, and using all fractions, in succession, to percolate a fresh portion of coffee.

7. The process of making coffee extract, consisting in placing roasted ground coffee in a closed vessel, thoroughly saturating the same with a liquid formed by previously percolating water through a similar portion of coffee, allowing the saturated coffee to macerate in the surrounding liquid, taking off the percolate in separate successive fractions, utilizing the first of said fractions as a finished product, the second and third of said fractions to saturate a succeeding portion of coffee, and the rest of said fractions in succession to circulate through said second portion of coffee.

8. The process of making coffee extract, consisting in placing roasted ground coffee in a closed vessel, exhausting the air and occluded gases, thoroughly saturating the ground coffee with a liquid formed by previously percolating cold water through a similar portion of coffee, allowing the saturated coffee to macerate in the surrounding liquid, taking off the percolate in successive separate fractions of progressively decreasing strength, using the second fraction of said percolate to moisten a fresh portion of roasted ground coffee contained in a closed vessel, forcing the third fraction of said percolate into said second portion of coffee, allowing the same to stand, forcing out the liquid from said second portion of coffee by forcing the successive fractions of percolate through said second portion of coffee in succession, and taking all of said percolate from said second portion of coffee in separate successive fractions of decreasing strength.

9. The process of making coffee extract, consisting in placing roasted ground coffee in a closed vessel, exhausting the air and occluded gases, thoroughly saturating the roasted coffee with a liquid formed by previously percolating cold water through a similar portion of coffee, allowing the saturated coffee to macerate in the surrounding liquid, forcing the percolate out of said portion of coffee, then forcing through said portion of coffee percolates of successively decreasing strength, all of said percolates being separated into successive fractions of decreasing strength.

10. The process of making coffee extract, consisting in roasting green coffee beans, immediately grinding the same, immediately introducing the ground coffee into a closed vessel and extracting the air and occluded gases from said vessel, thoroughly saturating said ground coffee with a liquid formed by previously percolating cold water through a similar portion of coffee, allowing the saturated coffee to macerate in the surrounding liquid, taking off the percolates in separate successive fractions, and utilizing all except the first of said percolate fractions for treating a successive portion of coffee.

11. The process of making coffee extract, consisting in placing roasted ground coffee in a closed vessel, exhausting the air and occluded gases, thoroughly saturating the ground coffee with a liquid formed by previously percolating cold water through a similar portion of coffee, allowing the saturated coffee to macerate in the surrounding liquid, taking off the percolate in successive separate fractions of progresisvely decreasing strength, using the second fraction of said percolate to moisten a fresh portion of roasted ground coffee contained in a closed vessel, forcing the third fraction of said percolate into said second portion of coffee, allowing the same to macerate in the surrounding liquid, forcing the fourth and successive fractions of percolate through said second portion of coffee in succession and taking all of said percolate from said second portion of coffee in separate successive fractions of decreasing strength.

12. The process of making coffee extract, consisting in placing roasted ground coffee in a closed vessel, exhausting the air and occluded gases, thoroughly saturating the roasted coffee with a liquid formed by previously percolating cold water through a similar portion of coffee, allowing the saturated coffee to macerate in the surrounding liquid, then forcing through the said portion of coffee percolates of successively decreasing strength, all of said percolates being separated into successive fractions of decreasing strength.

13. The process of making coffee extract comprising charging a percolator with a portion of roasted ground coffee, exhausting the air and occluded gases from said charge of coffee, subjecting the exhausted charge to a pressure above atmospheric pressure, percolating cold water through said coffee, and percolating a portion of the percolate thereby obtained in a cold state through another charge or portion of roasted ground coffee.

In testimony whereof, we hereunto sign our names.

FRANK L. SLOCUM.
WILLIAM E. TROUTMAN.